United States Patent [19]

Kaiser

[11] Patent Number: 5,129,922

[45] Date of Patent: Jul. 14, 1992

[54] METHOD AND APPARATUS FOR REMOVING CONTAMINATED AIR FROM AN ENCLOSED DIRTY AIR SPACE

[76] Inventor: David M. Kaiser, 1403 Woodland Dr., Santa Paula, Calif. 93060

[21] Appl. No.: 659,280

[22] Filed: Feb. 22, 1991

[51] Int. Cl.⁵ .............................................. B01D 46/04
[52] U.S. Cl. ........................................ 55/96; 55/294; 55/302; 55/303; 55/431; 422/22
[58] Field of Search .............. 422/22, 32, 33; 55/302, 55/303, 431, 294, 470, 96–97

[56] References Cited

U.S. PATENT DOCUMENTS

| | | | |
|---|---|---|---|
| 3,233,391 | 2/1966 | Olsen | 55/294 |
| 3,377,780 | 4/1968 | Nobud | 55/294 |
| 3,898,062 | 8/1975 | Slakey | 55/303 |
| 3,964,883 | 6/1976 | Nakao | 55/96 |
| 4,689,055 | 8/1987 | Kochan | 55/294 |

Primary Examiner—James C. Housel
Assistant Examiner—Lyle Alexander
Attorney, Agent, or Firm—Gene W. Arant

[57] ABSTRACT

Contaminated air is drawn from a relatively enclosed dirty air space and filtered to remove both contaminants and other particulate materials. A main mechanical filter is positioned between the dirty air space and a surrounding environment which is to be protected from contamination. An exhaust fan is positioned on the output side of the main filter, to create a partial vacuum within the dirty air space. An irradiation device is positioned on the output side of the main filter. A secondary vacuum system is utilized to create a secondary vacuum that is substantially stronger than the partial vacuum applied to the main filter, and the secondary vacuum is applied to successive selected portions of the air input side of the main filter for creating a reverse air flow to clean contaminants and other particulate materials which are being continuously deposited there. Within the secondary vacuum system air is circulated through at least one filter element that is located remotely to the dirty air space, and the thus filtered air is then dumped back into the air input side of the main filter. Accumulated particulate material is removed from the remote filter from time to time, without entering the dirty air space itself.

7 Claims, 3 Drawing Sheets

METHOD AND APPARATUS FOR REMOVING CONTAMINATED AIR FROM AN ENCLOSED DIRTY AIR SPACE

BACKGROUND OF THE INVENTION

The present invention is directed toward reducing contamination within an enclosed dirty air space while protecting a surrounding environment from that contamination. Although this problem is similar to that of maintaining the well known clean rooms which are extensively used for scientific work such as electronics, in fruit storage facilities, and the like, it is also a very much different problem.

In conventional clean room technology the room that must be kept clean is typically pressurized slightly above the atmospheric pressure of its surroundings. Air that has been filtered and purified external to the clean room is fed in at a somewhat higher pressure so as to maintain an elevated pressure within the room. The room may have one or more doors for ingress and egress, and the positive pressure of the air within the room is relied upon to ensure that any air flow through such openings occurs only in the outward direction, thus protecting the clean atmosphere within the room.

Many presently known filter systems require periodic shutdowns for replacement of the filters, which then interrupts the flow of cleaned air and also involves significant maintenance and cleanup expense.

The present invention deals with high levels of contaminant materials in a relatively enclosed dirty air space, which high levels of contaminant materials must be removed from the air while preventing the spread of the contaminants into adjacent environment that surrounds the enclosed dirty air space.

SUMMARY OF THE INVENTION

This invention relates to a method and apparatus for producing essentially particulate free air on a continuous, uninterrupted basis to remove or kill contaminants and other particulate material, in situations where high levels of contaminant materials must be removed from a relatively enclosed dirty air space and it is necessary to prevent the spread of the contaminants to surrounding areas.

According to the method of the present invention contaminated air is drawn from a relatively enclosed dirty air space and filtered to remove both bacterial contaminants and other particulate materials. A passageway is established which communicates between the dirty air space and the surrounding environment. A main mechanical filter is positioned within the passageway with its air input side adjacent the dirty air space. A partial vacuum is created on the output side of the main mechanical filter in order to continuously draw air from the dirty air space into the surrounding environment and thereby cause contaminants and other particulate materials to be continuously deposited onto the air input side of the main mechanical filter. A secondary vacuum system is selected which is adapted to create a secondary vacuum that is substantially stronger than the partial vacuum applied to the main filter. The secondary vacuum is successively applied to selected different portions of the air input side of the main filter for cleaning them by means of a reverse air flow. Air is circulated within the secondary vacuum system through at least one filter element that is located outside the dirty air space, and after being partially cleaned is then dumped back into the enclosed dirty air space, i.e., the intake side of the main filter. This provides a closed system.

An important and distinguishing feature of the present invention is that the secondary vacuum system is located outside the enclosed dirty air space. Thus, at least one filter element is located in the secondary vacuum system external to the dirty air space. From time to time the particulate material that has been accumulated in the filter element of the external portion of the secondary vacuum circuit is disposed of, without interrupting the continuous operation of the main filter.

According to the invention it is also preferred to irradiate the air within the passageway on the clean or output side of the main mechanical filter, in order to kill bacteria and viruses which may have penetrated the mechanical filter, before the filtered air enters the surrounding environment.

Thus the object and purpose of the invention is to provide a method and apparatus for filtering air on a continuous, uninterrupted basis to remove or kill both contaminants and other particulate material, in situations where high levels of contaminant materials must be removed from a relatively enclosed dirty air space and it is necessary to prevent the spread of the contaminants to surrounding areas.

DRAWING SUMMARY

DETAILED DESCRIPTION

The invention has found its initial application in the food industry, for packing houses for fresh lemons, which must be handled differently from other types of fruit because of their notorious susceptibility to degradation due to mold spores.

Figure 2:
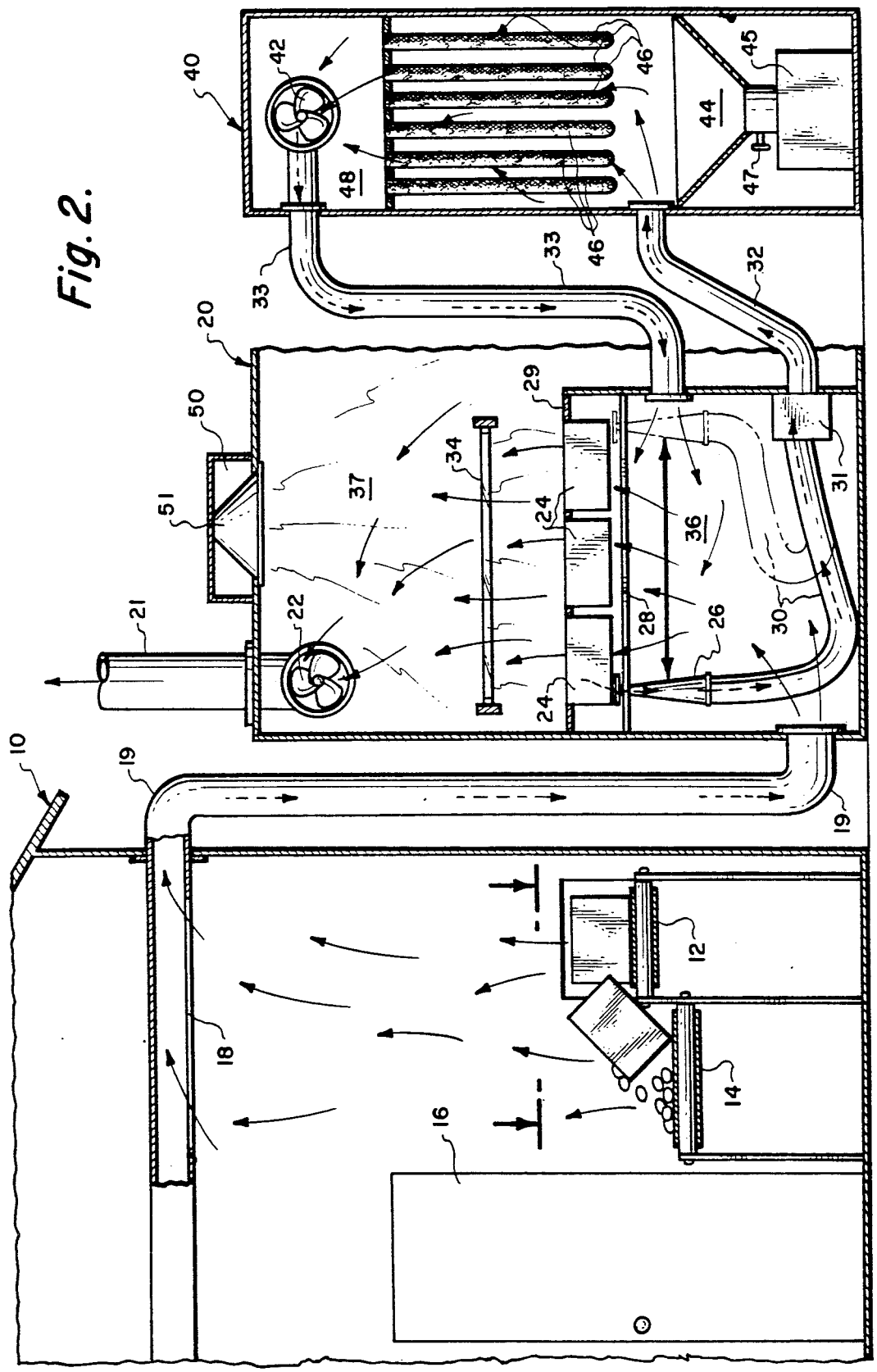
FIG. 2 is a schematic elevation view of a complete air cleaning and sterilizing system in accordance with the present invention, including primary and secondary air cleaning modules located adjacent to and in communication with the lemon dump room of a lemon packing plant.
Figure 3:
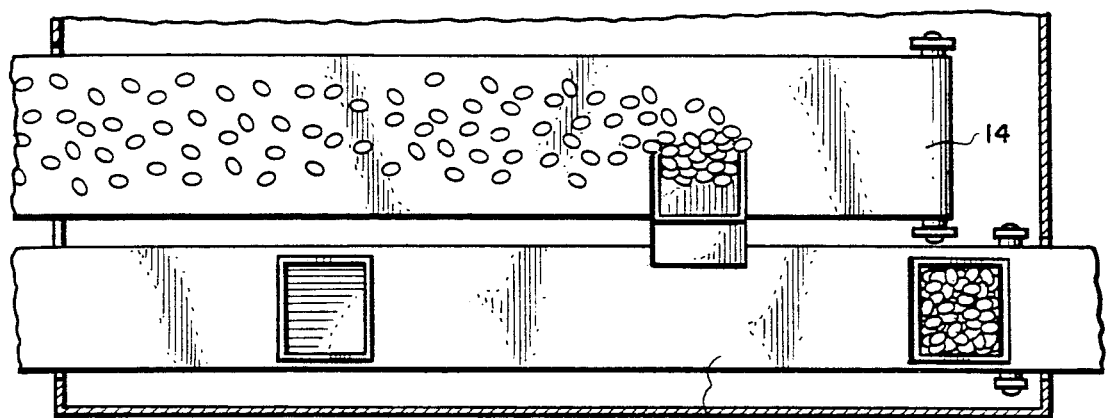
FIG. 3 is a top plan view of the interior arrangement of the lemon dump room, taken on Line 3—3 of FIG. 2.

As shown in FIGS. 2 and 3 of the drawings, a lemon dump room 10 which is a portion of a lemon packing plant has a first conveyor 12 upon which boxes of lemons are brought into the room and are then dumped from their boxes onto a second conveyor 14 which transports them out of the room. Water is being sprayed onto the lemons as they are dumped, as is indicated schematically by the spray nozzle 15. Although not specifically shown there are limited openings, preferably restricted by curtains or the like, through which air flow into the interior of the room is possible. A walk-in door 16 which must be at least occasionally used also provides an opening through which air flow into the interior of the room may occur.

Figure 1:
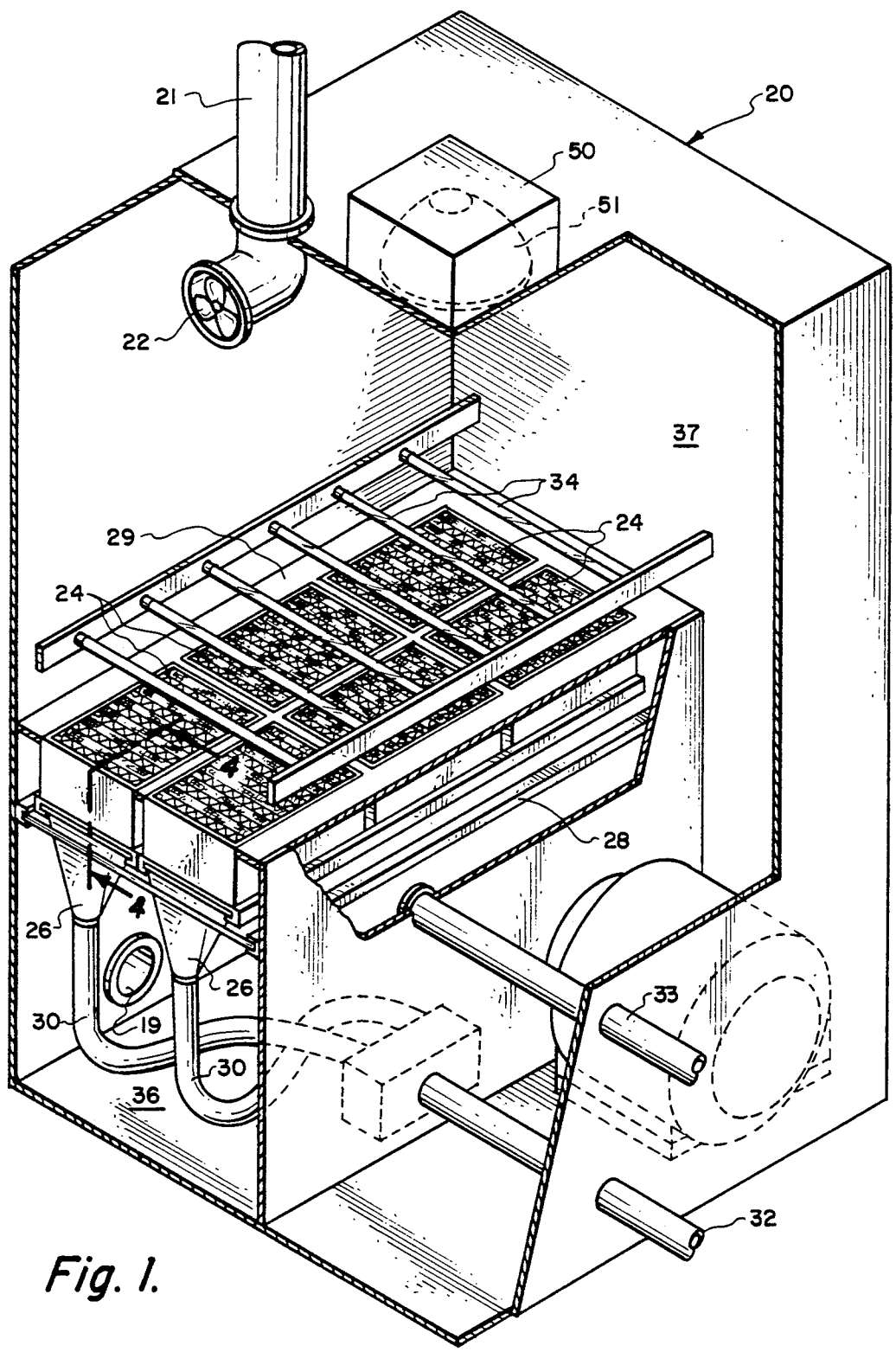
FIG. 1 is a perspective view of a typical arrangement of a primary module in accordance with the present invention.

A primary air cleaning module 20 in accordance with the invention is shown in perspective in FIG. 1, with its mode of operation being schematically illustrated in FIG. 2. Module 20 creates a partial vacuum inside the room. A secondary air cleaning module 40 in accordance with the present invention provides cleaning of the primary module 20, which is constantly available, on demand.

The unique application of the invention in lemon packing plants will now be briefly described. Since the sales season and the production season do not always coincide, it is presently an established practice to process fresh lemons twice when necessary. When the lemons are first picked they are washed, covered with fungicidal material and wax, and then placed in cool rooms (also preferably operated as clean rooms) where the temperature is typically maintained at about 55 degrees F. The temperature level may be modified in order to either inhibit or encourage the ripening process. Several months later, when the lemons are needed for sale, they are moved into the dump room 10 where they are dumped from their containers for repacking. It is at this time that huge clouds of dry dust containing millions of blue and green mold spores are released. The mold spores are such a strong contaminant material that a rather small quantity of them can do serious damage to fruit or any other food product.

Processing of the lemons in accordance with the invention is accomplished as follows. The primary air cleaning module 20 is placed adjacent the dump room. An air intake slot 18 extends lengthwise of the dump room above the conveyors 12, 14. A large conduit or passageway 19 couples the intake or pickup slot 18 to the module 20. Module 20 is a fully enclosed housing whose upper portion 37 is designated as a clean air space while its lower portion 36 is designated as a dirty air space. Passageway 19 feeds the incoming dirty air into the lower portion 36. In its upper or clean portion 37 the module 20 contains an exhaust fan 22 which pulls the clean air into an exit conduit 21 and hence into the surrounding environment. Fan 22 is of sufficient size and capacity to impart a negative pressure level—i.e., below atmospheric—through the conduit 19 to the entire dump room. Although there are openings in the dump room 10 for boxes of previously stored lemons to be moved in, for empty boxes and lemons after dumping to be moved out, and also for at least one walk-in door, the negative air pressure level within the room is still sufficient to prevent any significant leakage of the mold spores out of the room through those openings.

A bank of main mechanical filters 24 attached to a horizontal separator wall 29 separate the dirty air space 36 within module 20 from the clean air space 37. The filters are arranged in horizontal banks or rows with their air entry side down, so that cleaned air escapes on their upper side and their lower and air input side is adjacent the dirty air space. These main mechanical filters 24 are of the HEPA or absolute type and are driven by the exhaust fan 22 positioned on their upper or air output side, which creates a primary vacuum source and hence draws the air through the main filters 24 in order to clean the air. Arrows indicate the air flow through conduit 19 into the space 36 and hence into the main filters. Particulate material then collects on their air input or underneath side. Cleaned air flows out of the primary module into the surrounding environment through the conduit 21.

The presently preferred type of HEPA—high efficiency particulate air—filter utilizes a polypropylene media folded in the usual serpentine configuration over corrugated separators made of aluminum or a non-reactive material. The operative portion of one of the filters is illustrated in the fragmentary elevation view shown in FIG. 4.

A vacuum cleaning head 26 is positioned on the under or dirty side of each row of main filters. A pair of horizontal tracks 28 are provided beneath the bank of HEPA filters for supporting the vacuum cleaning head 26, which is shown only in schematic form. A motor, not specifically shown, drives the cleaning head in a horizontal reciprocating movement. As a further feature of the system, detection means (not specifically shown) is provided to detect when resistance to air flow through the main filters has increased above a predetermined level, and to then automatically actuate the cleaning heads for cleaning the dirty side of the main filters.

Figure 4:
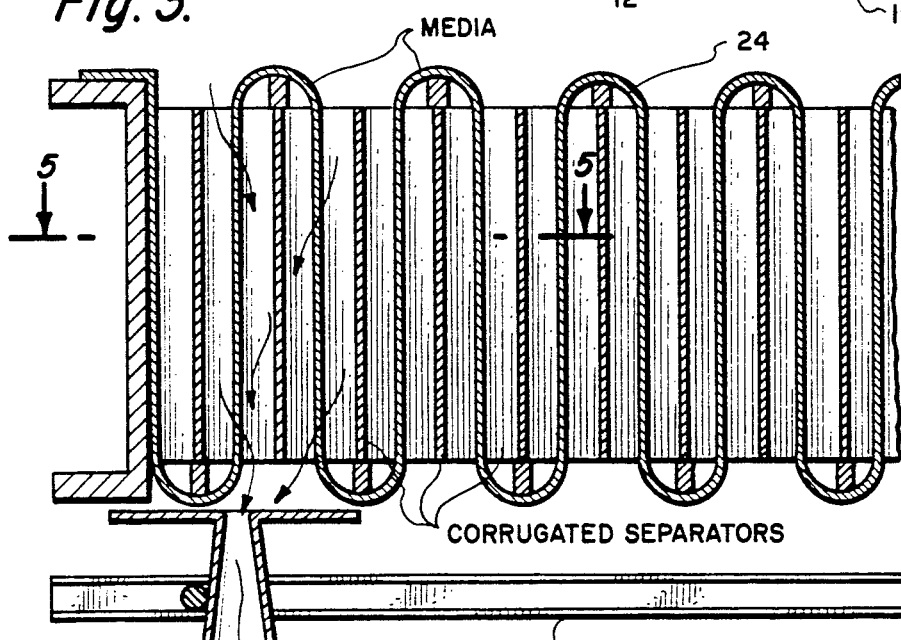
FIG. 4 is a fragmentary cross-sectional elevation view taken on the Line 4—4 of FIG. 2 and showing the reverse flow cleaning of a main filter by the secondary vacuum system.
Figure 5:
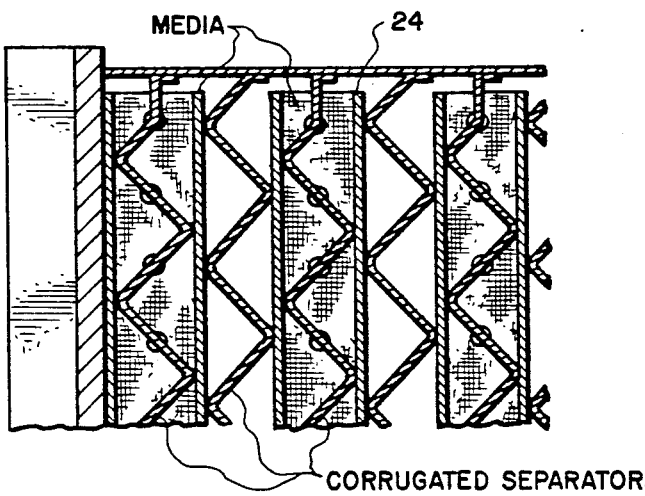
FIG. 5 is a fragmentary cross-sectional elevation view taken on the Line 5—5 of FIG. 3 and showing the arrangement of the corrugated separators in the HEPA filter.

A secondary air cleaning module 40 has a separate housing which may be located somewhat remotely to the primary module 20. It contains a secondary vacuum circuit arranged in a series loop. The secondary vacuum circuit, by means of an exhaust fan 42 creates a far higher level of vacuum than the primary vacuum source. A flexible collecting hose 30 extends from each of the vacuum heads 26 to a common plenum 31 located at the wall of the housing of primary module 20, which is coupled outside through an outlet conduit 32 to the secondary air cleaning module 40. The vacuum from each vacuumized cleaning head 26 overpowers the primary vacuum, reversing the air flow through a particular portion of the main filter with which the cleaning head is then in operative engagement, and thus removing particulate material that is clinging to the dirty surface of the main filters. As shown in FIGS. 4 and 5, the vacuum head 26 engages bottom portions of the serpentine fold of the filter media, and between each two adjacent folds having a plurality of corrugated separators each of which separates two adjacent panels of the media in parallel relation therewith and in each of which the longitudinal axis of the corrugations extends perpendicular to the associated folded-over portion between the panels, which not only separate the two adjacent folds of the filter media but also permit air to be pulled in the reverse flow direction by the vacuum head 26. A return hose 33 conveys air that has been filtered in the secondary module back into the primary air cleaning module 20 on it dirty air side 36.

The flow of cleaned air through the main filters continues at all times. The higher vacuum from the cleaning heads 26 must overcome the primary vacuum system at the point where the cleaning head is applied to the under side of a main filter. However, each cleaning head 26 is successively moved over different sections of its associated main filter 24. Thus the cleaning head never obstructs a significant portion of the front surface area of a particular bank of main filters, hence the greatest portion of each bank of main filters is operative at all times.

On the clean or air output side of the main filters, it is greatly preferred to use germicidal lamps to irradiate and hence sterilize the previously filtered air. The germicidal lamps 34 (FIG. 2) are needed to destroy bacteria and viruses which are capable of passing through the HEPA filters.

An additional and very important feature of the system is the processing of the now-dirty air that is recovered by the secondary vacuum system. That air is first passed through the plenum 31 and line 32 and through a gravitational filter chamber 44 and a coarse type of secondary mechanical filter 46 for removing relatively large objects or particles, including many mold spores or clumps of mold spores. Then the dirty air that remains, which contains only relatively small particles, is fed back through the return conduit 33 to the dirty side of the main filters. This last step of the process avoids dumping dirty air into any relatively clean adjacent rooms or areas, or into the environment outside of the packing plant.

The coarse type of secondary mechanical filter 46 includes a plurality of tubes made of a special cloth acting as a filter media, each tube hanging vertically and being of considerable length. A standard pulsing technique is used to apply bursts of air pressure from their upper ends, which then causes particulate material clinging to their outer surfaces to drop into the chamber 44.

The gravitational filter chamber 44 has a bottom wall of conical or other tapered configuration which feeds through a manual shut-off valve 47 into a drum 45. Drum 45 may typically be of rather large capacity, such as 30 gallons or more. From time to time the valve 47 is manually closed while the drum 45 is being intermittently emptied.

An additional feature of the system is a loudspeaker 51 supported in a housing 50 which is supported in the top wall of module 20. Whenever a cleaning operation by vacuum head 26 is in progress, electrical audio signals are fed to the speaker 51, and sound signals emanating from the speaker then impinge upon the output side of the main filters 24. The audio signals are selected at a frequency or frequencies and with such amplitude as accelerate the separation of particulate materials from the input side of the main filter in response to the secondary vacuum and reverse air flow.

Thus in its application to lemons the present invention utilizes negative pressure in the dump room; automatic self-cleaning of the HEPA filters; return of the partially cleaned air generated from the secondary module to the dirty side of the HEPA filters; and placement of the filters of the secondary vacuum circuit outside the confines of the dump room so that accumulated particulate material may be conveniently disposed of without contaminating the surrounding environment.

ALTERNATE FORMS

Although the invention has now been described in detail in conjunction with its application to the processing of fresh lemons without contaminating a surrounding environment, it also has utility in other situations where contaminated air is to be removed from an air handling system or other relatively enclosed air space. In such an application it is important to use a HEPA filter with a polypropylene media folded in the usual serpentine configuration over corrugated separators, which may be made of aluminum, or perhaps of a plastic material to resist corrosion. Radiation from a source such as the source 34, and application from a sound source such as from the speaker 51, may also be used to advantage.

A secondary vacuum system may then be used to clean the air input side of the HEPA filter as described above, applying a reverse air flow over successive portions of the surface of the air input side of the filter. As an alternative to, or in addition to, the secondary vacuum system, water or steam may be applied to the input side of the main filter to clean it, since the polypropylene will not permit the passage of water.

A presently preferred embodiment of the invention has been described in detail in order to comply with the patent law. The scope of the invention, however, is to be measured only in accordance with the appended claims.

What I claim is:

1. The method of drawing contaminated air from a relatively enclosed dirty air space and filtering it to remove most contaminants and other particulate materials while protecting a surrounding environment from contamination, which comprises the steps of:
   establishing a passageway which communicates between the dirty air space and the surrounding environment;
   positioning a main mechanical filter within the passageway with its air input side adjacent the dirty air space;
   creating a partial vacuum on the output side of the main mechanical filter in order to continuously draw air from the dirty air space into the surrounding environment and thereby cause contaminants and other particulate materials to be continuously deposited onto the air input side of the main mechanical filter;
   selecting a secondary vacuum system adapted to create a secondary vacuum that is substantially stronger than the partial vacuum applied to the main filter;
   applying the secondary vacuum successively to selected different portions of the air input side of the main filter for removing contaminants and other particulate material by means of a reverse air flow;
   circulating the air created by the secondary vacuum within the secondary vacuum system through at least one filter element that is located external to the dirty air space; and
   then dumping the thus circulated and partially cleaned air back into the passageway at the air input side of the main mechanical filter in a closed system operation.

2. The method of claim 1 which includes the additional step of irradiating the air within the passageway on the output side of the main mechanical filter, in order to kill bacteria and viruses before the filtered air enters the surrounding environment.

3. The method of claim 1 which includes the additional step of intermittently disposing of the particulate material that has been accumulated in said external portion of said secondary vacuum circuit by said at least one filter element.

4. Apparatus for drawing air from a relatively enclosed dirty air space and filtering it on a continuous, uninterrupted basis to remove both contaminants and other particulate materials while preventing the spread of the contaminants to a surrounding environment, comprising:
   a main mechanical filter having an air input side communicating with said dirty air space and an air output side communicating with the surrounding environment;

means for creating a partial vacuum on the air output side of said main mechanical filter, thereby continuously drawing air through said main mechanical filter and depositing contaminants and other particulate materials on said air input side of said main mechanical filter;

a vacuum head located within said dirty air space in operative engagement with a portion of the air input side of said main filter;

means for moving said vacuum head about so that it is successively in operative engagement with different portions of the surface of said air input side of said main filter;

a secondary vacuum circuit in the form of a closed loop having an input end coupled to said vacuum head and an output end coupled to the air input side of the main mechanical filter said dirty air space, said secondary vacuum circuit including means for creating at said vacuum head a secondary vacuum that is substantially stronger than the partial vacuum applied to said main filter;

said secondary vacuum circuit having a portion thereof located external to the dirty air space, and including at least one filter element located in said external portion for removing particulate material that is picked up by said small vacuum head, whereby air that has passed through said at least one filter element is then dumped back at the air input side of the main mechanical filter space; and means for intermittently disposing of the particulate material accumulated in said external portion of said secondary vacuum circuit by said filter element.

5. The apparatus of claim 4 which further includes means for irradiating the filtered air on the output side of said main mechanical filter, before it enters the surrounding environment, in order to kill bacteria and viruses which may penetrate the main filter.

6. The method of drawing contaminated air from a relatively enclosed dirty air space and filtering it to remove contaminants and particulate materials while protecting a surrounding environment from contamination, comprising the steps of:

selecting a primary filter circuit including a main mechanical filter having air input and air output sides;

placing the air input side of the main mechanical filter in communication with the dirty air space, and its air output side in communication with the surrounding environment;

applying a primary vacuum source to the air output side of the main mechanical filter;

selecting a secondary filter circuit including a vacuum head and a secondary filter;

applying the vacuum head in operative engagement with a portion of the air input side of the main mechanical filter, and then moving the vacuum head into operative engagement with successively different portions of the air input side of the main mechanical filter;

selecting a secondary vacuum source which is of substantially greater strength than said primary vacuum source;

applying the secondary vacuum source to the vacuum head so as to induce a reverse air flow through the main mechanical filter and thereby clean the main filter;

circulating and filtering the reversely flowing air in the secondary vacuum circuit; and then dumping the thus circulated and partially cleaned air from the secondary vacuum circuit back to the air input side of the main mechanical filter in a closed system operation.

7. The method of drawing dirty air from an enclosed dirty air space and filtering it in order to provide clean air to an adjacent clean environment, comprising the steps of:

utilizing a primary filter circuit including a main mechanical filter to continuously pass air from the dirty air space through the input side of the filter to the adjacent clean environment while concurrently capturing particulate material on the input side of the mechanical filter;

utilizing a secondary filter circuit including a vacuum head by applying the vacuum head in operative engagement with successive portions of the air input side of the main mechanical filter;

energizing the secondary filter circuit with a vacuum source of sufficient strength to induce a reverse air flow through the main mechanical filter and thereby remove particulate material that had previously been captured on the mechanical filter; and dumping partially cleaned air circulated through the secondary vacuum circuit back to the input side of the primary filter.

* * * * *

UNITED STATES PATENT AND TRADEMARK OFFICE
CERTIFICATE OF CORRECTION

PATENT NO.   : 5,129,922

DATED         : July 14, 1992

INVENTOR(S) : David M. Kaiser

It is certified that error appears in the above-identified patent and that said Letters Patent is hereby corrected as shown below:

Claim 4, Column 7, Line 17, the words, "said dirty air space" should be deleted.

Signed and Sealed this

Twenty-third Day of November, 1993

Attest:

BRUCE LEHMAN

Attesting Officer

Commissioner of Patents and Trademarks